United States Patent
Saleh et al.

(10) Patent No.: US 12,274,988 B2
(45) Date of Patent: Apr. 15, 2025

(54) DENDRIMERIC CARBON DOT-POLYAMIDE MEMBRANES

(71) Applicants: Saudi Arabian Oil Company, Dhahran (SA); King Fahd University of Petroleum & Minerals, Dhahran (SA)

(72) Inventors: Tawfik A. Saleh, Dhahran (SA); Fahd Ibrahim AlGhunaimi, Dhahran (SA); Norah Aljuryyed, Dhahran (SA); Hind S. Aldossary, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 20 days.

(21) Appl. No.: 17/942,932

(22) Filed: Sep. 12, 2022

(65) Prior Publication Data

US 2024/0082791 A1 Mar. 14, 2024

(51) Int. Cl.
| | |
|---|---|
| *B01D 71/60* | (2006.01) |
| *B01D 67/00* | (2006.01) |
| *B01D 69/12* | (2006.01) |
| *B01D 71/56* | (2006.01) |
| *C01B 32/05* | (2017.01) |
| *C02F 1/44* | (2023.01) |
| *C02F 101/12* | (2006.01) |
| *C02F 101/20* | (2006.01) |
| *C02F 101/32* | (2006.01) |
| *C02F 103/08* | (2006.01) |
| *C08G 83/00* | (2006.01) |

(52) U.S. Cl.
CPC .......... *B01D 71/60* (2013.01); *B01D 67/0006* (2013.01); *B01D 67/0083* (2013.01); *B01D 69/1213* (2022.08); *B01D 71/56* (2013.01); *C01B 32/05* (2017.08); *C02F 1/44* (2013.01); *C08G 83/003* (2013.01); *C02F 2101/12* (2013.01); *C02F 2101/20* (2013.01); *C02F 2101/32* (2013.01); *C02F 2103/08* (2013.01)

(58) Field of Classification Search
None
See application file for complete search history.

(56) References Cited

U.S. PATENT DOCUMENTS

2013/0203873 A1* 8/2013 Linder .................. B01D 71/68
521/27

OTHER PUBLICATIONS

Yi Li, Sha Li, Kaisong Zhang, Influence of hydrophilic carbon dots on polyamide thin film nanocomposite reverse osmosis membranes, Journal of Membrane Science, vol. 537, 2017, pp. 42-53 (Year: 2017).*

(Continued)

*Primary Examiner* — Jason M Greene
*Assistant Examiner* — Eric J McCullough
(74) *Attorney, Agent, or Firm* — Fish & Richardson P.C.

(57) ABSTRACT

A dendrimeric carbon dot-polyamide membrane, a method for making the dendrimeric carbon dot-polyamide membrane, and a method for producing purified water are provided. An exemplary carbon dot-polyamide membrane includes polyamidoamine dendrimeric carbon dots and a polyamide membrane. The polyamidoamine dendrimeric dots are dispersed throughout the polyamide membrane.

19 Claims, 10 Drawing Sheets

(56) References Cited

OTHER PUBLICATIONS

Farhad Asempour, et al., Chlorine-resistant TFN RO membranes containing modified poly(amidoamine) dendrimer-functionalized halloysite nanotubes, Journal of Membrane Science, vol. 623, 2021, 119039 (Year: 2021).*

Teimouri M, Nia AH, Abnous K, Eshghi H, Ramezani M. Graphene oxide-cationic polymer conjugates: Synthesis and application as gene delivery vectors. Plasmid. Mar.-May 2016;84-85:51-60. (Year: 2016).*

Jian Chu, et al., Enrichment of uranium in seawater by glycine cross-linked graphene oxide membrane, Chemical Engineering Journal, vol. 444, 2022, 136602 (Year: 2022).*

Nur Akma Mahat, Siti Aisyah Shamsudin, Transformation of oil palm biomass to optical carbon quantum dots by carbonisation-activation and low temperature hydrothermal processes, Diamond and Related Materials, vol. 102, 2020, 107660 (Year: 2020).*

Clark, "Committee report: membrane processes," American Water Works Association, Jun. 1998, 90(6):91-105, 15 pages.

Dmitrieva et al., "Polymeric membranes for oil-water separation: A review," Polymers, Feb. 2022, 14(5):980, 25 pages.

Hoseinpour et al., "Surface modification of PES membrane via aminolysis and immobilization of carboxymethylcellulose and sulphated carboxymethylcellulose for hemodialysis," Carbohydrate Polymers, May 2018, 188:37-47, 11 pages.

Jadav et al., "Synthesis of novel silica-polyamide nanocomposite membrane with enhanced properties," Journal of Membrane Science, Feb. 2009, 328(1-2):257-267, 12 pages.

Lianchao et al., "A novel nanofiltration membrane prepared with PAMAM and TMC by in situ interfacial polymerization on PEK-C ultrafiltration membrane," Journal of Membrane Science, Feb. 2006, 269(1-2):84-93, 10 pages.

Qiu et al., "Ionic dendrimer based polyamide membranes for ion separation," ACS Nano, Mar. 2021, 15(4):7522-7535, 14 pages.

Singh et al., "A comprehensive review of polymeric wastewater purification membranes," Journal of Composites Science, Jun. 2021, 5(6):162, 22 pages.

Yu et al., "Study on polyamide thin-film composite nanofiltration membrane by interfacial polymerization of polyvinylamine (PVAm) and isophthaloyl chloride (IPC)," Journal of Membrane Science, Sep. 2011, 379(1-2):164-173, 10 pages.

Zhu et al., "A novel membrane showing both hydrophilic and oleophobic surface properties and its non-fouling performances for potential water treatment applications," Journal of Membrane Science, Jun. 2013, 436:47-56, 10 pages.

* cited by examiner

DENDRIMERIC CARBON DOT-POLYAMIDE MEMBRANES

TECHNICAL FIELD

The present disclosure is directed to dendrimeric carbon dot-polyamide membranes for use in water filtration technologies.

BACKGROUND

Membrane technology is widely used to purify polluted water and desalinate seawater due to properties such as high treatment efficiency, low chemical usage and low energy requirements. The thin-film-composite (TFC) membranes include a substrate layer and an interfacial polymerized polyamide (PA) active layer. The substrate layer of the TFC membrane gives mechanical support against the working pressure exerted on the membrane, while the active layer separates various substances (e.g., impurities) while allowing water to flow through the TEC membrane.

SUMMARY

An embodiment described in examples herein provides a method of making a dendrimeric carbon dot-polyamide membrane. The method includes forming dendrimeric carbon dots and preparing a porous membrane substrate to yield a prepared porous membrane substrate. The dendrimeric carbon dots are dispersed in a solvent containing m-phenylenediamine to yield a mixture. The prepared porous membrane substrate is immersed into the mixture. The mixture is coated in a presence of trimesoyl chloride to yield a thin-film-composite membrane precursor. The thin-film-composite membrane precursor is heated to yield the dendrimeric carbon dot-polyamide membrane.

Another embodiment described in examples herein provides a dendrimeric carbon dot-polyamide membrane. The dendrimeric carbon dot-polyamide membrane includes polyamidoamine dendrimeric carbon dots and a polyamide membrane. The polyamidoamine dendrimeric carbon dots are dispersed throughout the polyamide membrane.

Another embodiment described in examples herein provides a method for producing purified water. The method includes flowing a water feedstock through a dendrimeric carbon dot-polyamide membrane. The dendrimeric carbon dot-polyamide membrane includes polyamidoamine dendrimeric carbon dots and a polyamide membrane, wherein the polyamidoamine dendrimeric carbon dots are dispersed throughout the polyamide membrane. The method further includes isolating one or more substances in a retentate in the dendrimeric carbon dot-polyamide membrane. The purified water is produced in a permeate from the dendrimeric carbon dot-polyamide membrane.

DETAILED DESCRIPTION

Figure 1:
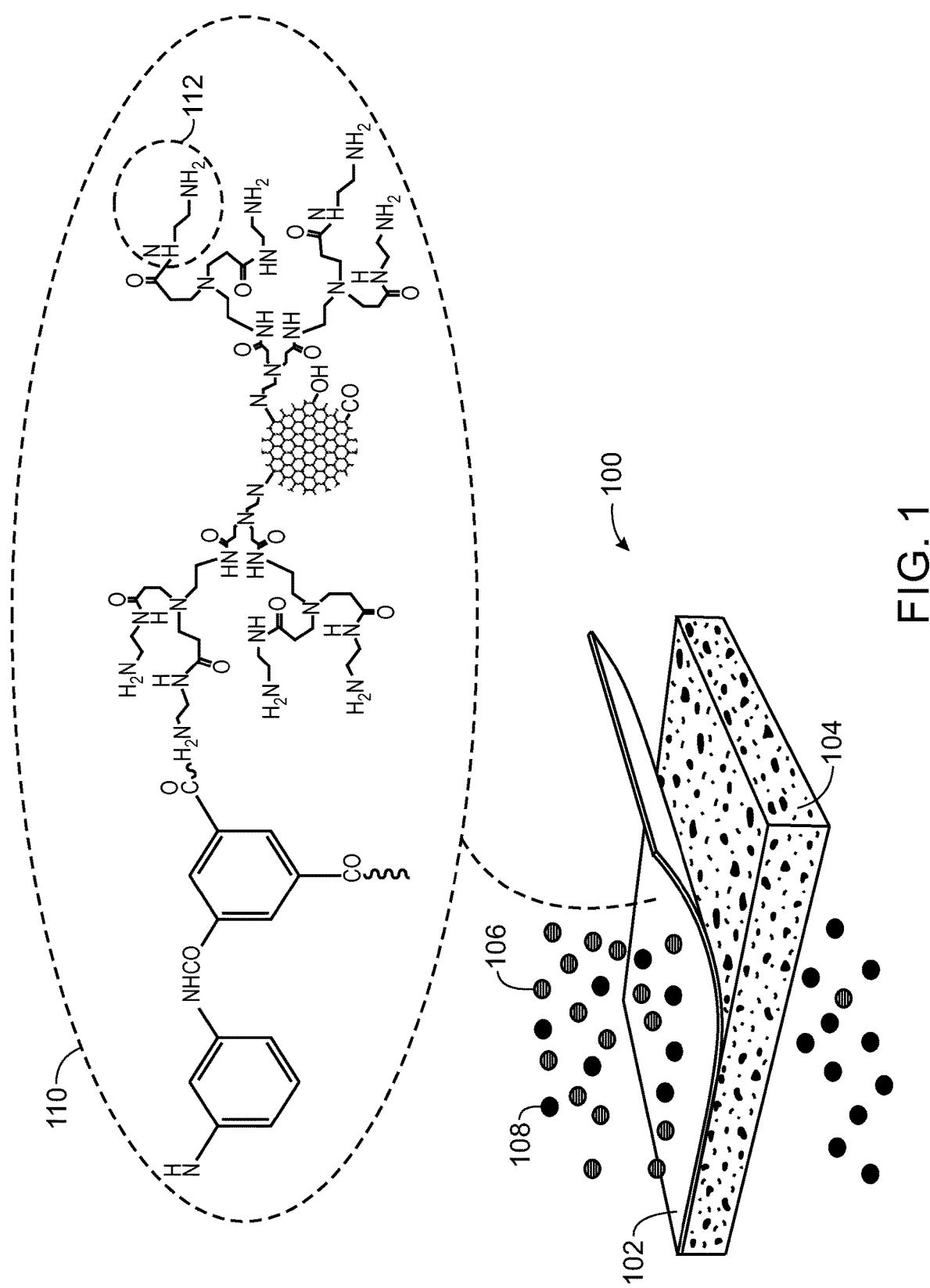
FIG. 1 is a schematic diagram of a thin-film-composite membrane.

FIG. 1 is a schematic diagram of a thin-film-composite (TFC) membrane 100 and its use for water purification. A polyamide active layer 102 including one or more polymers derived from polyamide (PA) rests on a porous substrate layer 104. The porous substrate layer 104 can be a porous membrane (e.g., a polyethersulfone membrane). The polyamide active layer 102 is impermeable to impurities 106 including salt ions, organic molecules, and metal ions, but is permeable to water 108. The impurities 106 are rejected by the membrane and remain in the retentate on the input side of the membrane while water 108 flows through the polyamide active layer 102 and the porous substrate layer 104 as purified water in a permeate to the output side of the membrane.

Referring to FIG. 1, this disclosure describes the synthesis of carbon dots chemically modified with polyamidoamine (PAMAM) dendrimers 110, their incorporation into polyamide active layer 102, and their use in water filtration. The carbon nanostructures enhance the capacity of TFC membranes to remove substances (e.g., impurities 106) from water 108. The protonation state of the membrane's functional groups has a substantial impact on its surface charge. Therefore, hydrophilic materials with amine and carboxyl groups are advantageous for improving membrane properties. The PAMAM's amine groups 112 are incorporated to the PA layer by reacting with the PA layer's carboxyl groups (—COOH). The branching structure of PAMAM dendrimers chemically bound to the carbon dots provide a multiplicity of potential protonation/deprotonation sites, thus enhancing the hydrophilicity of the membrane and improving its filtration and antifouling properties.

Carbon dots (CDs) are part of the nanocarbon family with nanoparticles sizes of about 50 nm and below. CDs consist of amorphous and crystalline parts, mainly composed of carbon with a fringe spacing which can correspond to the interlayer spacing of graphite. CDs have advantageous properties including distinctive optical behavior, tunable emission, compatibility with functional groups, good biocompatibility, chemical and photo-stability, low toxicity, and low-cost production. CD properties can be changed by controlling their size, shape, and heteroatom doping and by modifying their surfaces. Carbon dot classifications include carbonized polymer dots, carbon quantum dots, graphene quantum dots. Carbon dot structures include nanospheres, quasi-nanospheres, nanotubes, nanorods, nanosheets, and stacked nanosheets.

Carbon dots can be made using "top-down" and "bottom-up" synthetic methods. Top down methods including oxide cutting of larger graphitized carbon materials such as graphite powder, carbon rods, carbon fibers, carbon nanotubes, carbon black, or graphene oxide into small pieces. Bottom up methods involve production from small molecules, polymers, or biomass by assembling, polymerization, crosslinking, and carbonization (e.g., combustion, thermal treatment). In one example, carbon dots are made by heating biomass (e.g., plant leaves) under an inert atmosphere to form carbonized biomass, cooling the carbonized biomass, dispersing the carbonized biomass in a solvent to form a mixture, sonicating the mixture and filtering the mixture to mixture to yield carbon dots.

Figure 2:
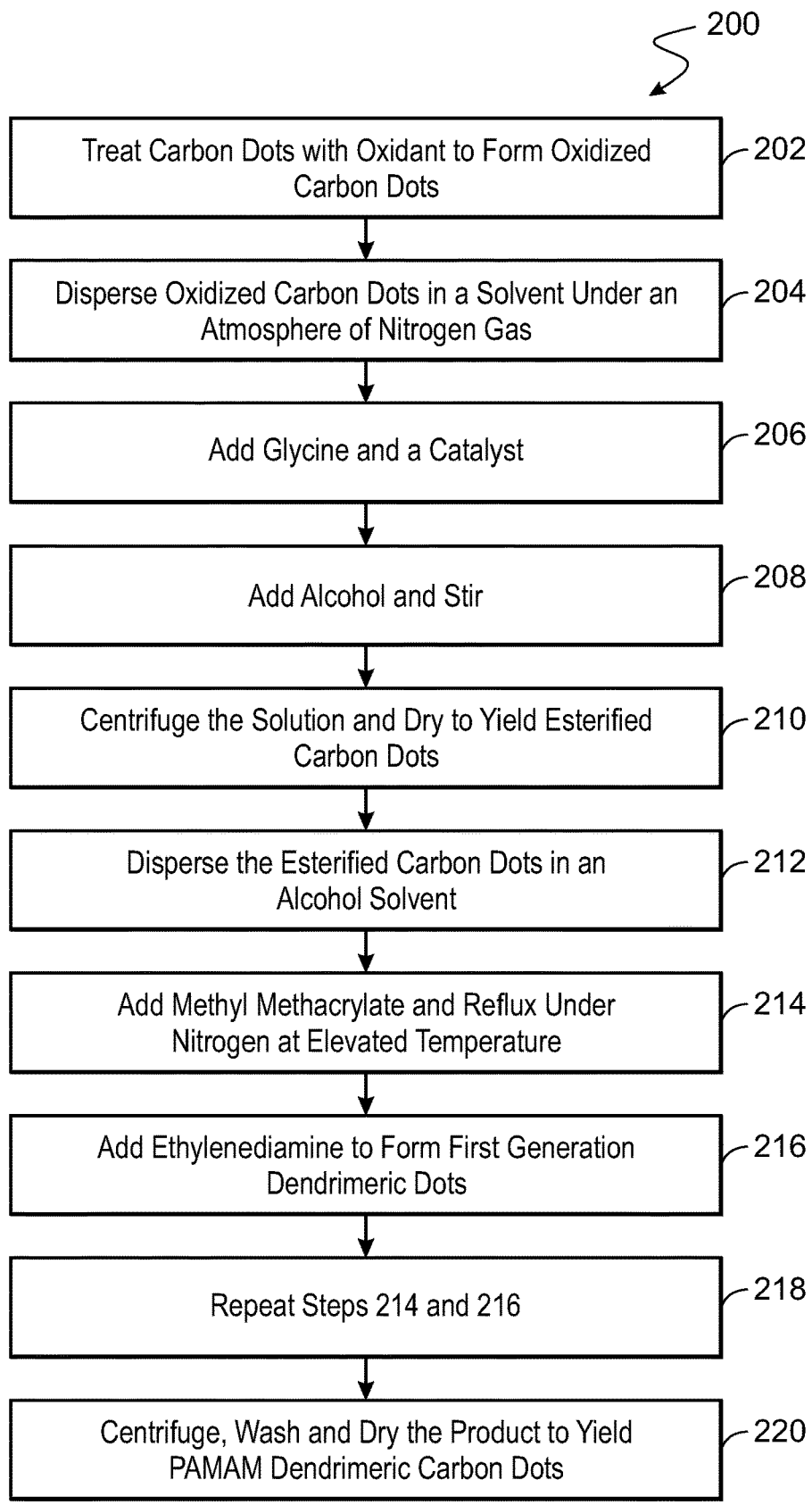
FIG. 2 is a process flow diagram of a method for the synthesis of dendrimeric carbon dots.

FIG. 2 is a process flow diagram of a method 200 for the synthesis of PAMAM dendrimeric carbon dots. The method begins at block 202, when the carbon dots are oxidized by treatment with an oxidant (e.g., hydrogen peroxide) while being sonicated. The oxidized carbon dots are collected using filtration by centrifugation. At block 204, the oxidized carbon dots are dispersed in a solvent. The solvent can be an alcohol (e.g. methanol). The carbon dots can be dispersed using sonication. An inert gas (e.g. nitrogen) is used to purge oxygen from the reaction vessel. At block 206, the amino acid glycine is added and a catalyst (e.g., para toluene sulfonic acid) is added to yield the esterified carbon dots. At block 208, an alcohol (e.g., ethanol) is added and the mixture is stirred. At block 210, the solution is centrifuged and the solution is dried to yield the esterified carbon dots. At block 212, esterified carbon dots are dispersed in an alcohol solvent (e.g., methanol). At block 214, methyl methacrylate is added and the mixture is refluxed under nitrogen at elevated temperature to form half generation dendrimeric carbon dots. The mixture is then allowed to cool. At block 216, ethylenediamine is added to form full generation dendrimeric carbon dots. At block 218, steps described at blocks 214 and 216 are repeated n times to form an n generations of polyamidoamine dendrimers, where n can be in a range of about 1 to 10. When the desired number of dendrimer generations have been formed, at block 220 the product is centrifuged, washed and dried to yield the PAMAM dendrimeric carbon dots.

Figure 3:
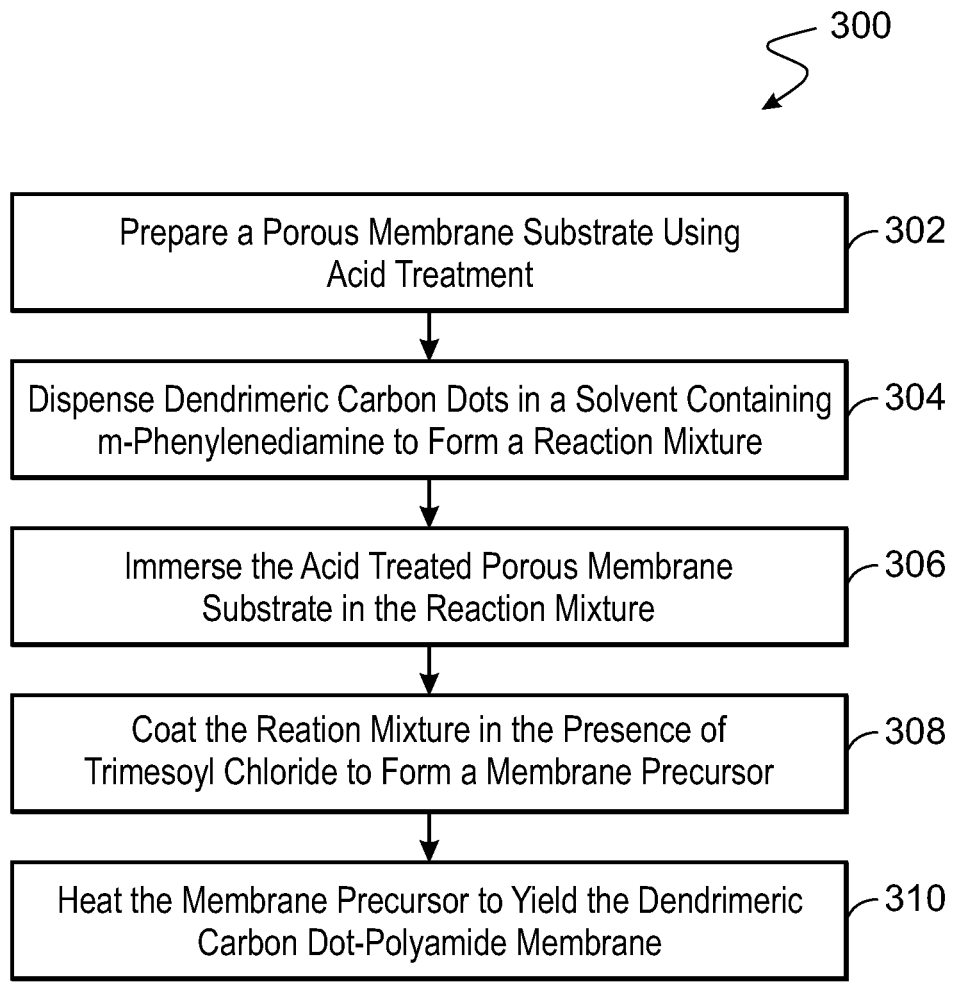
FIG. 3 is a process flow diagram of a method for the synthesis of dendrimeric carbon dot-polyamide membranes.

FIG. 3 is a process flow diagram of a method 300 for the formation of dendrimeric carbon dot-polyamide membranes. The method begins at block 302, when a porous membrane substrate (e.g., polyethersulfone membrane) is prepared by immersion in acid solution. At block 304, the PAMAM dendrimeric carbon dots are dispensed in a solvent (e.g., water) containing m-phenylenedeamine to form a reaction mixture. At block 306, the acid treated membrane substrate is immersed in the reaction mixture. At block 308, the reaction mixture is coated on the polyethersulfone membrane (e.g., using a doctor blade coating machine) in the presence of trimesoyl chloride in an organic solvent (e.g., n-hexane) to form a thin-film-composite membrane precursor. At block 310, the membrane precursor is heated to yield the dendrimeric carbon dot-polyamide membrane.

The dendrimeric carbon dot-polyamide membranes can be used for the purification of water feedstocks, including seawater, wastewater, water used in industrial and agricultural processes, water from polluted waterways, and drinking water. Water feedstock can be flowed through the dendrimeric carbon dot-polyamide membranes under pressures ranging from 0 psi to 200 psi and at room temperature or at elevated temperature. Impurities Substances that can be removed from water feedstocks by the dendrimeric carbon dot-polyamide membranes include positive and negatively charged salts (e.g., sulfate ion, chloride ion, calcium ion, and magnesium ion), heavy metals (e.g., Pb and Cd), and organic compounds (e.g., hydrocarbons including pentane, decane, octane, hexadecane, and toluene).

EXAMPLES

Figure 4:
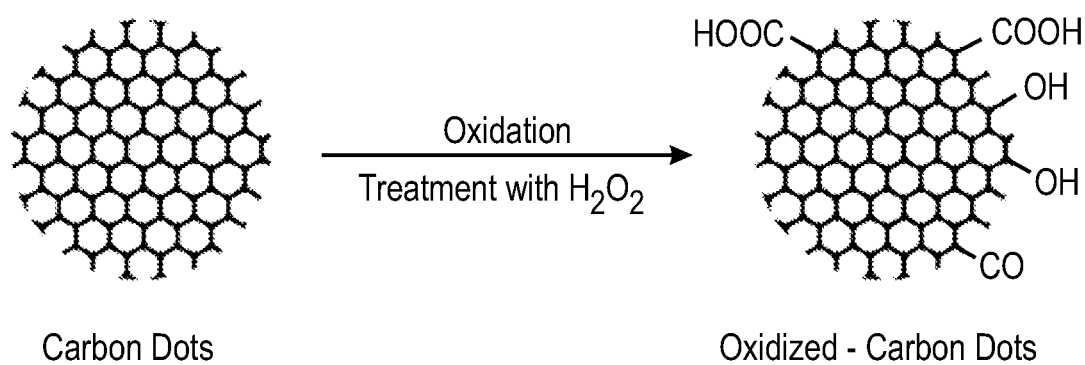
FIG. 4 depicts the synthesis of an oxidized carbon dot.

Synthesis of carbon dots. Carbon dots were synthesized using a thermal process followed by chemical treatment. The synthetic process of carbon dots was performed by heating for carbonization of palm plant leaves. About 50 g of palm leaves were heated at 300° C. for 3 h under the nitrogen atmosphere. The system was allowed to cool naturally. The mixture was dispersed in deionized water and ethanol (20%) and sonicated for 1 h. It was then filtered with 0.2 μm filter paper to yield the product carbon dots. Referring to FIG. 4, the carbon dots were then treated with $H_2O_2$ (10%) under sonication for 2 h. The reaction mixture was filtered by centrifugation to yield the oxidized carbon dots.

Esterification of carbon dots. 1 g carbon dots was added to a flask containing 150 ml methanol and sonicated for 2 h to disperse the dots. Nitrogen gas flowed in the flask to remove oxygen. The amino acid glycine was added to the mixture. Para toluene sulfonic acid was added to catalyze to have esterification reaction. Ethanol stirring was applied at room temperature for 24 h under stirring. Then, the solution was centrifuged and the product was dried at room temperature.

Figure 5:
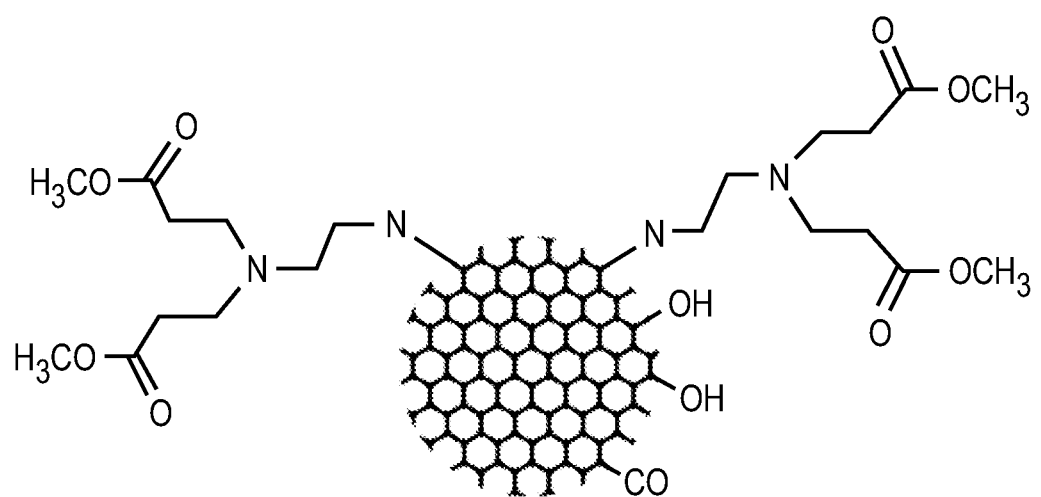
FIG. 5 depicts a carbon dot modified with first generation dendrimers.
Figure 6:
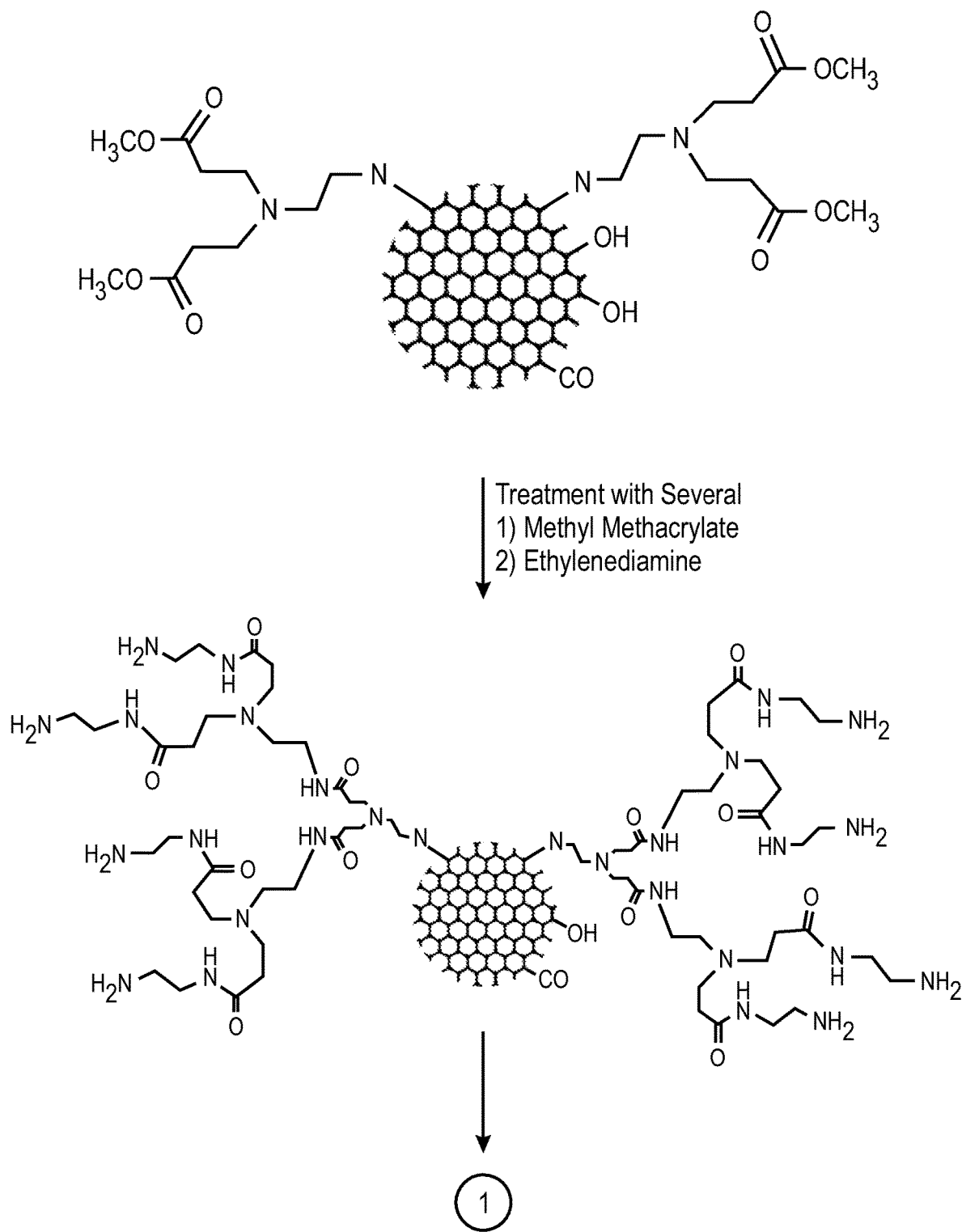
FIG. 6 depicts steps included in the synthesis of a carbon dot modified with $5^{th}$ generation dendrimers.

PAMAM Dendrimeric Carbon dots. About 2 g of the modified carbon dots was added into 100 ml of methanol solvent in a flask. 10 ml of methyl methacrylate was added. The system was refluxed in the nitrogen atmosphere for 1 day at 60° C. to produce the first half generation dendrimeric carbon dots. The system was allowed to cool. 10 ml of ethylenediamine was added. The system was refluxed to produce the first generation dendrimeric carbon dots shown in FIG. 5. The reaction steps involving methyl methacrylate and ethylenediamine were repeated until the production of 5 generations dendrimers were obtained, depicted in FIG. 6. The product was centrifuged and washed with methanol, and dried at room temperature.

Figure 7:
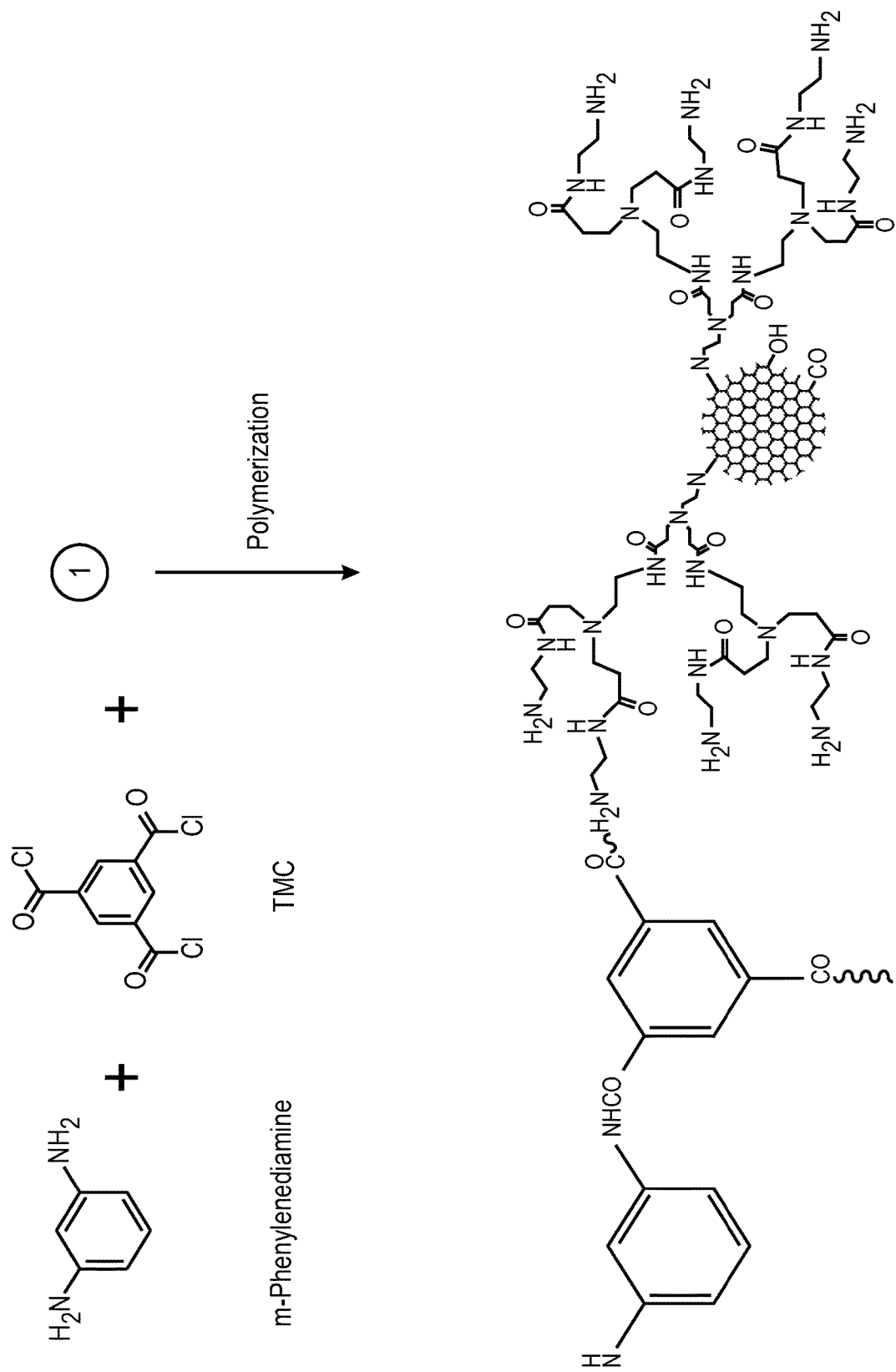
FIG. 7 depicts steps included in the formation of the dendrimeric carbon dot-polyamide membranes.

Carbon dot-modified membranes. Polyethersulfone membrane was used as a porous membrane substrate. The membrane substrate was immersed into a diluted solution of nitric acid for one day to activate the polyethersulfone surface in order facilitate adherence of the polyamide thin film into the substrate. The membrane was removed from the acid solution and, referring to FIG. 7, immersed into an aqueous solution containing dendrimer modified carbon dots (1, 2, 3 and 4%), in presence of m-phenylenediamine for 10 min. The membrane was formed by a lab-scale doctor blade coating machine in presence of 2 w/v % trimesoyl chloride (TMC) in n-hexane. The coating process was 5 min. in duration. The prepared membranes were taken into an oven with a temperature of 60° C. for 5 min to harden the polymeric material. The prepared membrane was cleaned with distilled water and retained on a glass plate until use. The thickness of the membrane was about 1 micrometer.

Membrane separation efficiency. The prepared membrane with an area of 36 $cm^2$ was fitted to the set-up cell provided by Sterlitech Company. The membrane permeability for pure solution and salt solution was measured. It was tested as a function of time under a pressure of 200 psi and room temperature. The permeate water was gathered in a specific cylinder for 4 min in many intervals of time. The test was run for approximately 3 hours using distilled water followed by the addition of the salt/oil solution for an additional 3 hour run. The membrane was run for approximately 1 hour to attain steady flux before readings were taken. In order to test the salts and hydrocarbons rejection, a 1000 ppm concentration of each salt including NaCl and $MgSO_4$ salts was added to the feed tank. To test heavy metal rejection, 100 ppm of lead and cadmium were also added. To test hydrocarbon rejection, 100 ppm concentration each of hydrocarbons including hexadecane, n-heptane, and toluene were also added to the feed tank. While adding the salt/oil solution to the tank, the feed solution was stirred continuously to exclude any polarization effect.

The following two equations were used to calculate the permeability and rejection of the membranes:

$$J = \frac{V}{At} \quad (1)$$

$$R(\%) = \left(1 - \frac{C_{per}}{C_{feed}}\right) \times 100 \quad (2)$$

where J is the permeate flux (L/m²h), V is the volume of the collected permeate water at a certain time (L), A is the effective area (m²) of the prepared membrane, t is the time elapsed in collecting the permeated sample (h), R is salt/oil rejection (%), $C_{per}$ is the concentration of the permeated water, and $C_{feed}$ is the concentration of the feed tank. The measurements were applied to two specimens for each membrane type and averaged to obtain the final values. Metal analysis was conducted using inductively coupled plasma. Organic components were analyzed by gas chromatography. Salt ions were analyzed using ion chromatography.

Figure 8:
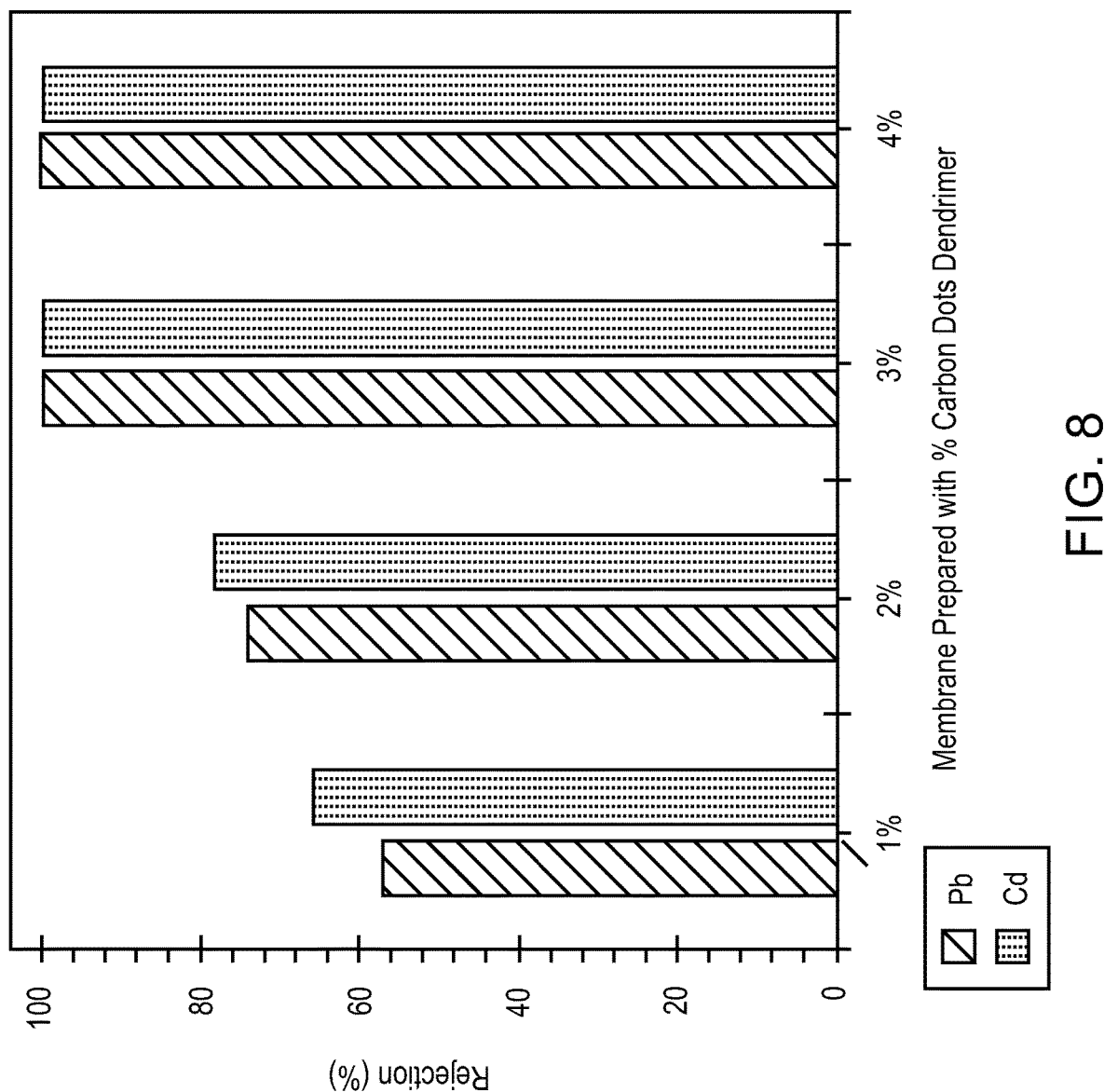
FIG. 8 is a plot showing the rejection of the dendrimeric carbon dot-polyamide membranes operation against heavy metals.
Figure 9:
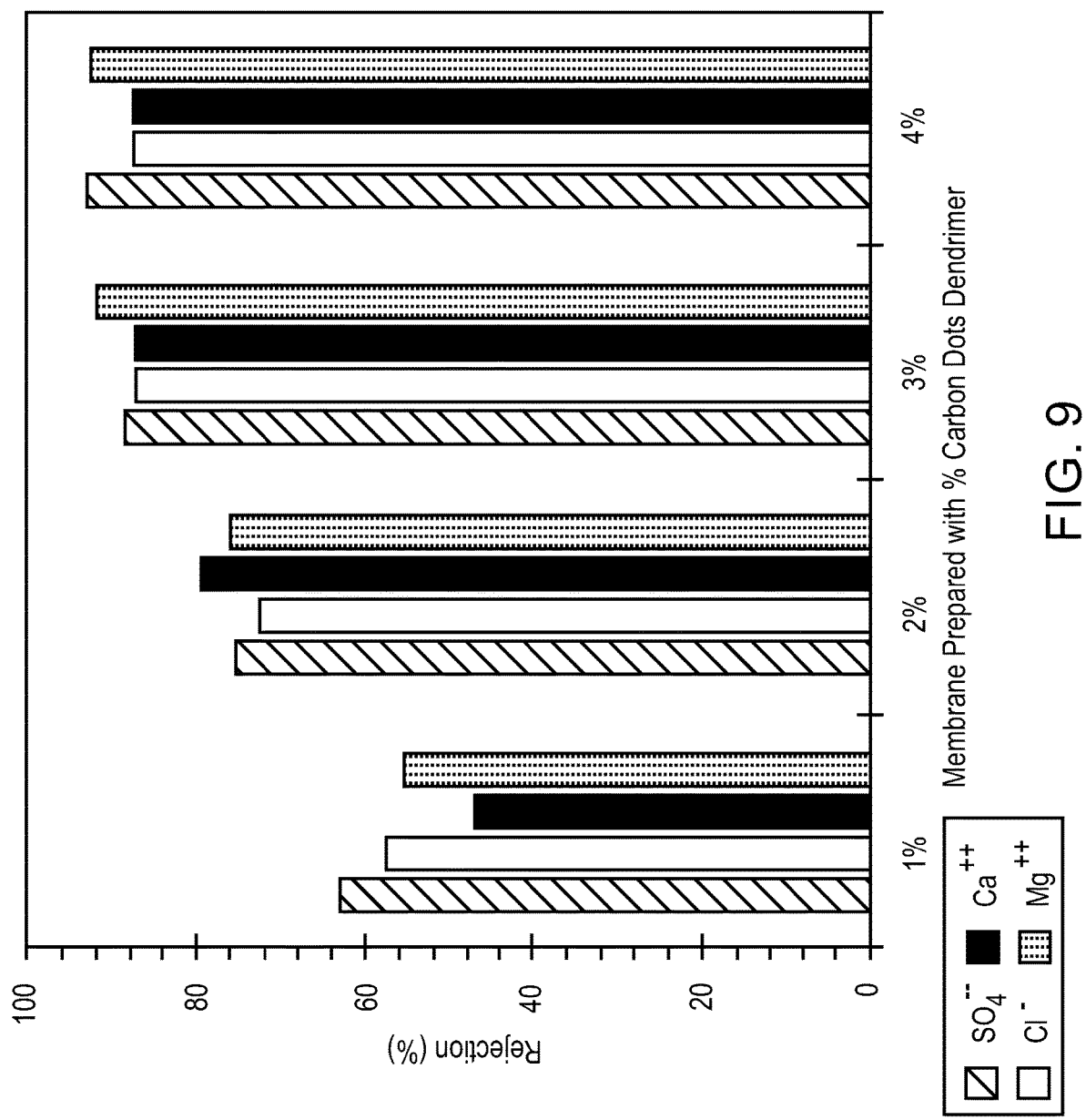
FIG. 9 is a plot showing the rejection of the dendrimeric carbon dot-polyamide membranes against salts.
Figure 10:
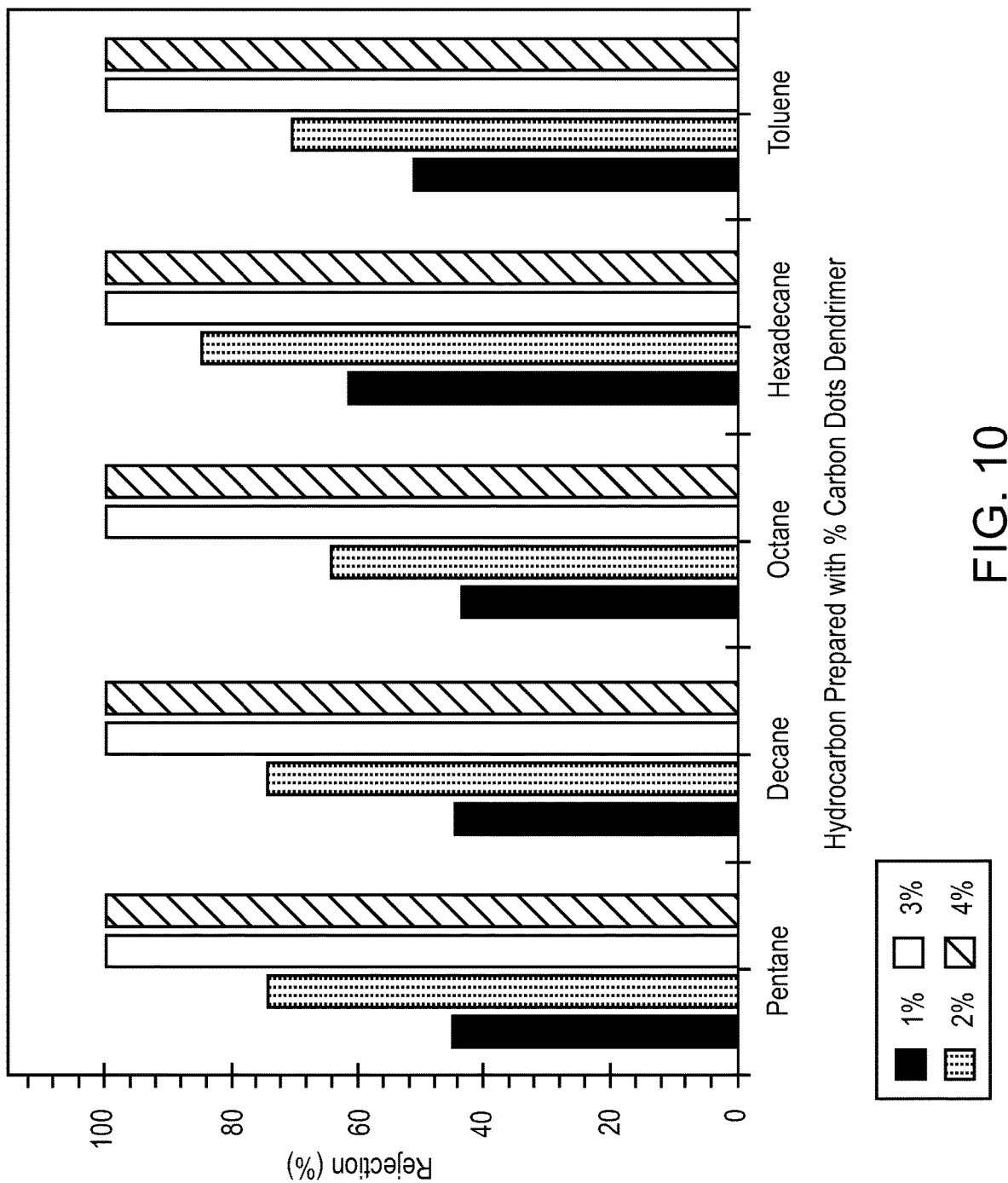
FIG. 10 is a plot showing the rejection of the dendrimeric carbon dot-polyamide membranes against organic contaminants.

Membrane Rejection performance. FIGS. 8-10 are plots showing the rejection percentage of the dendrimeric carbon dot-polyamide membranes against heavy metals, salts, and organic contaminants, respectively. An enhancement in the rejection efficiency was observed after modifying the membrane with the dendrimeric carbon dots. The higher rejection percentage obtained by the modified membranes indicates that the dendrimeric carbon-dot modified membrane is more effective in removing all contaminants compared to the unmodified membrane. The removal efficiencies of the modified membrane toward organic contaminants and heavy metals are higher compared to salts. The modified membrane displayed a rejection of 100% for heavy metals and organic pollutants, over 94% for ($SO_4$, Mg), and 87% for (Cl, Ca). The higher heavy metals rejection may be due to the strong affinity that nitrogen has a for Cd and Pb ions. The adsorbed ions formed a double layer repelling co-ion, contributing to the increased rejection rate observed. The decline of the rejection with time may be caused by the continual growth of ionic pressure from the separated solutes and contaminants collecting on the membrane surface. Continuously applying pressure to the membrane may also alter its porosity characteristics.

An embodiment described in examples herein provides a method of making a dendrimeric carbon dot-polyamide membrane. The method includes forming dendrimeric carbon dots and preparing a porous membrane substrate to yield a prepared porous membrane substrate. The dendrimeric carbon dots are dispersed in a solvent containing m-phenylenediamine to yield a mixture. The prepared porous membrane substrate is immersed into the mixture. The mixture is coated in a presence of trimesoyl chloride to yield a thin-film-composite membrane precursor. The thin-film-composite membrane precursor is heated to yield the dendrimeric carbon dot-polyamide membrane.

In an aspect, the dendrimeric carbon dots include polyamidoamine dendrimeric carbon dots. In an aspect, forming the polyamidoamine dendrimeric carbon dots includes obtaining carbon dots, combining carbon dots with an oxidant to yield oxidized carbon dots, combining the oxidized carbon dots with a reaction mixture including glycine and a catalyst under an atmosphere of nitrogen to yield esterified carbon dots, and combining the esterified carbon dots with methyl methacrylate to yield half generation dendrimeric carbon dots, combining the half generation dendrimeric carbon dots with ethylenediamine to form full generation dendrimeric carbon dots, and combining the full generation dendrimeric carbon dots with methyl methacrylate and ethylenediamine a number of times to form polyamidoamine dendrimeric carbon dots.

In an aspect, the porous membrane substrate includes a polyethersulfone substrate membrane. In an aspect, preparing a porous substrate includes immersing the porous substrate in acid solution. In an aspect, the number of times is in a range of about 1 to 10.

In an aspect, the oxidant includes hydrogen peroxide. In an aspect, the catalyst includes para toluene sulfonic acid. In an aspect, the oxidized carbon dots include carboxyl groups, carbonyl groups, or hydroxyl groups. In an aspect, obtaining the carbon dots includes heating biomass under an atmosphere of nitrogen gas to form carbonized biomass, cooling the carbonized biomass, dispersing the carbonized biomass in a solvent to form a mixture, sonicating the mixture to form a sonicated mixture, and filtering the sonicated mixture to yield carbon dots. In an aspect, the biomass includes palm leaves.

Another embodiment described in examples herein provides a dendrimeric carbon dot-polyamide membrane. The dendrimeric carbon dot-polyamide membrane includes polyamidoamine dendrimeric carbon dots and a polyamide membrane. The polyamidoamine dendrimeric carbon dots are dispersed throughout the polyamide membrane.

In an aspect, the polyamidoamine dendrimeric carbon dots are modified with n generation polyamidoamine dendrimers, wherein n is in a range of about 1 to 10.

Another embodiment described in examples herein provides a method for producing purified water. The method includes flowing a water feedstock through a dendrimeric carbon dot-polyamide membrane. The dendrimeric carbon dot-polyamide membrane includes polyamidoamine dendrimeric carbon dots and a polyamide membrane, wherein the polyamidoamine dendrimeric carbon dots are dispersed throughout the polyamide membrane. The method further includes isolating one or more substances in a retentate in the dendrimeric carbon dot-polyamide membrane. The purified water is produced in a permeate from the dendrimeric carbon dot-polyamide membrane.

In an aspect, the water feedstock includes seawater. In an aspect, the one or more substances include salt. In an aspect, the salt includes chloride ion, calcium ion, magnesium ion, or sulfate ion. In an aspect, the one or more substances includes an organic compound. In an aspect, the organic compound includes pentane, decane, octane, hexadecane, or toluene. In an aspect, the one or more substances include a metal. In an aspect, the metal includes lead or cadmium.

Other implementations are also within the scope of the following claims.

What is claimed is:

1. A method of making a dendrimeric carbon dot-polyamide membrane, comprising:
   forming dendrimeric carbon dots;
   preparing a porous membrane substrate to yield a prepared porous membrane substrate;
   dispersing the dendrimeric carbon dots in a solvent containing m-phenylenediamine to yield a mixture;
   immersing the prepared porous membrane substrate into the mixture;
   coating the mixture in a presence of trimesoyl chloride to yield a thin-film-composite membrane precursor; and heating the thin-film-composite membrane precursor to yield the dendrimeric carbon dot-polyamide membrane;

wherein the dendrimeric carbon dots comprise polyamidoamine dendrimeric carbon dots, and forming the polyamidoamine dendrimeric carbon dots comprises:

obtaining carbon dots;

combining the carbon dots with an oxidant to yield oxidized carbon dots;

combining the oxidized carbon dots with a reaction mixture comprising glycine and a catalyst under an atmosphere of nitrogen to yield esterified carbon dots;

combining the esterified carbon dots with methyl methacrylate to yield half generation dendrimeric carbon dots;

combining the half generation dendrimeric carbon dots with ethylenediamine to form full generation dendrimeric carbon dots; and combining the full generation dendrimeric carbon dots with methyl methacrylate and ethylenediamine a number of times to form polyamidoamine dendrimeric carbon dots.

2. The method of claim 1, wherein the porous membrane substrate comprises a polyethersulfone substrate membrane.

3. The method of claim 1, wherein preparing a porous substrate comprises immersing the porous substrate in acid solution.

4. The method of claim 1, wherein the number of times is in a range of about 1 to 10.

5. The method of claim 1, wherein the oxidant comprises hydrogen peroxide.

6. The method of claim 1, wherein the catalyst comprises para toluene sulfonic acid.

7. The method of claim 1, wherein the oxidized carbon dots comprise carboxyl groups, carbonyl groups, or hydroxyl groups.

8. The method of claim 1, wherein obtaining the carbon dots comprises:

heating biomass under an atmosphere of nitrogen gas to form carbonized biomass;

cooling the carbonized biomass;

dispersing the carbonized biomass in a solvent to form a mixture;

sonicating the mixture to form a sonicated mixture; and filtering the sonicated mixture to yield carbon dots.

9. The method of claim 8, wherein the biomass comprises palm leaves.

10. A dendrimeric carbon dot-polyamide membrane prepared by the method of claim 1.

11. The dendrimeric carbon dot-polyamide membrane of claim 10, wherein the polyamidoamine dendrimeric carbon dots are modified with n generation polyamidoamine dendrimers, wherein n is in a range of about 1 to 10.

12. A method for producing purified water, comprising;

flowing a water feedstock through a dendrimeric carbon dot-polyamide membrane prepared by the method of claim 1;

isolating one or more substances in a retentate in the dendrimeric carbon dot-polyamide membrane; and producing the purified water in a permeate from the dendrimeric carbon dot-polyamide membrane.

13. The method of claim 12, wherein the water feedstock comprises seawater.

14. The method of claim 12, wherein the one or more substances comprise a salt.

15. The method of claim 14, wherein the salt comprises chloride ion, calcium ion, magnesium ion, or sulfate ion.

16. The method of claim 12, wherein the one or more substances comprise an organic compound.

17. The method of claim 16, wherein the organic compound comprises pentane, decane, octane, hexadecane, or toluene.

18. The method of claim 12, wherein the one or more substances comprise a metal.

19. The method of claim 18, wherein the metal comprises lead or cadmium.

* * * * *